June 30, 1953   R. C. FERGASON   2,643,657
CORN SNAPPING AND HUSKING ROLLS
Original Filed June 15, 1942
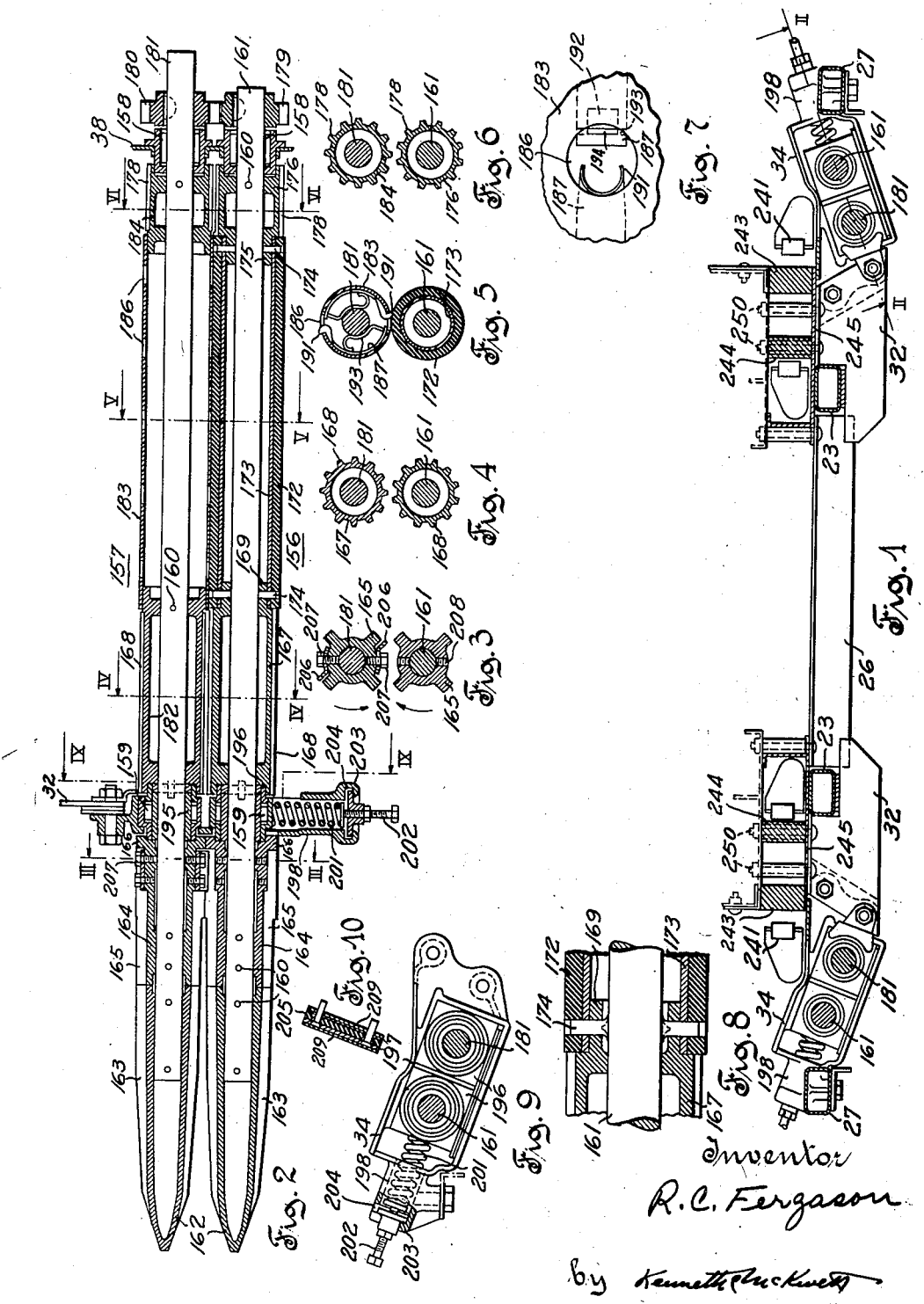
Inventor
R. C. Fergason
by Kenneth Luckett
Attorney Patented June 30, 1953

2,643,657

UNITED STATES PATENT OFFICE 2,643,657

CORN SNAPPING AND HUSKING ROLLS

Rector C. Fergason, La Porte, Ind., assignor to Allis-Chalmers Manufacturing Company, Milwaukee, Wis., a corporation of Delaware Original application June 15, 1942, Serial No. 447,025. Divided and this application January 12, 1948, Serial No. 1,879

10 Claims. (Cl. 130—5)

This invention relates in general to harvesting apparatus, and it has more particular relation to improvements in the design and construction of harvesting rolls such as find particular utility as a part of a corn harvesting apparatus in removing ears of corn from corn stalks and removing husks from the picked ears.

In certain forms of corn harvesters, such as are used for harvesting corn in the field, a pair of oppositely rotating cooperative rolls are provided, such rolls having forward picking or snapping sections and rearwardly disposed husking sections, with the picking and husking sections of the rolls disposed in axial alinement with each other and assembled on a common support, such as a rotatable shaft which serves to impart the desired rotation to the roll. Cooperative rolls of this general type, including a forward picker or snapper section, and a rearwardly disposed husking section, find considerable utility in light weight corn harvesters, especially such as are of the tractor-mounted, underslung type, such as is disclosed in applicant's copending application Serial Number 447,025, filed June 15, 1942, now abandoned, of which the present application is a division.

In the operation of harvester rolls of this general character, trash, particularly in the form of leaves and loose outer husks removed during the snapping of the corn from the stalks, is likely to be carried along rearwardly of the snapping sections of the roll and over the cooperative husking sections thereof, where such trash impedes or interferes with the efficient operation of the husking sections in removing husks from the snapped ears.

In prior art types of husking rolls, whether it be where the husking rolls are mounted separate from snapping or picking rolls or are mounted as rearwardly disposed sections of combined picking and husking rolls, difficulties of varying degrees are encountered in having such husking rolls or sections effectively remove the husks from the snapped ears, to the end that the removed husks may be effectively separated from the husked ears and the latter may be in clean condition. Different materials and different surface formations or contours of the cooperative husking rolls or sections, and different forms of auxiliary husking pins have heretofore been associated with surface portions of one or both of the cooperative husking rolls or sections, with the aim to improve the action of the rolls in effectively removing the husks from the ears and disposing of the removed husks. However, these expedients of the prior art, while possessed of advantages over earlier types of husking rolls, leave much to be desired in the matter of most efficient operation of the rolls as to removal of husks from the ears to produce cleanly husked ears, and to effective disposal of the removed husks so as to prevent their being carried along with the husked ears to a collecting receptacle for the latter.

The present invention, in one aspect thereof, contemplates and is concerned with the provision of oppositely rotatable, cooperative harvesting rolls suitably mounted in operative position and comprising forward picking or snapping sections and rearwardly disposed husking sections, along with suitable provisions for enabling or facilitating the discharge of trash, in the form of leaves and loose husks removed during the snapping operation, downwardly through the rolls, so as to prevent such trash from reaching the husking sections of the rolls and impeding most effective husking operation by the latter, and likewise insuring that such trash is not carried along with the husked ears to a collecting receptacle for the latter.

In a preferred embodiment of this feature of the invention, wherein the cooperative harvesting rolls each includes a forward snapping or picking section and a rearwardly disposed husking section, desirable results in the matter of removing such loose trash before the latter reaches the husking sections of the rolls are attained through the provision of a special roll section on each roll intermediate the snapping and husking sections thereof, such special roll sections being of such form and cooperating in such manner as to seize and pull through the rolls to the underneath side thereof any loose leaves or other trash at the upper side of the rolls resulting from the snapping operation, before such trash passes onto the husking roll sections. And the rolls may be provided with a correspondingly formed trash removing section rearwardly of the husking section to facilitate the passage downwardly through the rolls of any loose husks or the like that may remain at the upper side of the rear end portion of the rolls, thus preventing such loose husks from being dicharged from the husking sections along with the husked ears.

In another aspect, the present invention contemplates and is concerned with the provision of husking rolls or roll sections of such improved form and design as to material and contour of the cooperative portions of the rolls and auxiliary husking elements associated with one or both of the rolls, as will permit the latter to be set close together during normal operation wherein the rolls rotate in opposite directions, to insure loosening and most effective seizing of the husks and drawing of the latter downwardly through the rolls. In a preferred embodiment of this latter feature of the invention, particularly desirable results are attained in connection with such rolls through utilizing a roll having a yielding surface or facing of rubber, or like resiliently yielding material, in cooperation with a corresponding roll having a relatively smooth metal surface or facing, normal setting or mounting of the cooperative rolls being such that the surface portions thereof are in practical contact with each other at their inner adjacent surfaces during operation, and providing one of the rolls, preferably the metal faced roll, with husking elements or pegs normally projecting beyond the periphery of the roll and retractable to positions within or at the surface of the roll through the action of pressure exerted on the husking pegs by the other roll during operation, thus permitting the husking pegs to bite into and loosen the outer husks on the ears while permitting the rolls to rotate with their adjacent surfaces in practical contact, whereby the loosened husks are seized between the rolls and are thereby drawn downwardly through and discharged beneath the rolls, leaving the husked ears at the upper side of the rolls. And the design of the husking pegs and their mounted relation to the roll are such as to provide a very simple and effective form of husking peg which is readily and simply mounted in and removable from operative position.

It is an object of this invention to provide an improved and novel design and construction of harvesting rolls embodying axially alined snapping and husking sections with an intermediate trash-removing section between the snapping and husking sections of the rolls, either with or without trash removing sections disposed to the rear of the husking sections.

It is a further object of this invention to provide an improved and novel design and construction of cooperative husking rolls or roll sections wherein the rolls or roll sections are disposed in practical side abutting relation and wherein one of said roll sections is provided with apertures and has one or more husking elements yieldingly mounted therein with each element presenting a husking peg or point normally extending outwardly through an adjacent aperture to a point beyond the surface of the roll and being retractable during normal operation of the rolls, through surface engagement of the other roll on such husking points, to permit the adjacent surface portions of the rolls to pass one another in substantial engagement therewith.

It is a further object of this invention to provide a husking roll or roll section embodying one or more husking elements of improved design and construction, with each husking element having a husking point or peg and a resiliently yieldable support therefor, the husking element being readily insertable to position within a recess in said roll and serving to retain the husking peg normally projecting beyond the periphery of the roll and being yieldingly supported for swinging movement about a point spaced circumferentially from the peg portion thereof and being thus readily retractable within said recess through surface contact with an opposed roll section.

Still another object of this invention is to provide an improved mounting and spacing construction for cooperative harvesting rolls which includes a biasing means permitting forward portions of the rolls to move apart as stalks and other material pass therebetween and which avoids subjecting relatively movable bearing parts and/or opposed stalk gripping flutes or ribs to the frequent impact engagement and damage normally resulting from action of the biasing means tending to snap the rolls together when cleared of such material. And this aspect of the present invention is also concerned with and contemplates the provision of means which accurately determines minimum spacing of the rolls, which prevents bearing wear from affecting roll spacing, and which affords a simplified and inexpensive construction.

The above and other objects and advantages are attained by the present invention, various novel features of which will be apparent from the description herein and the accompanying drawings, disclosing an embodiment thereof, and will be more particularly pointed out in the annexed claims.

In the accompanying drawings:

Fig. 1 is a fragmental sectional view, in a transverse plane of a corn harvester, embodying features of the present invention;

Fig. 2 is a sectional view, in the plane of the line II—II of Fig. 1 with certain parts omitted in the interest of simplicity;

Figs. 3, 4, 5, and 6 are sectional views in the planes of the lines III—III, IV—IV, V—V and VI—VI, respectively, of Fig. 2;

Fig. 7 is an enlarged plan view of a portion of a detail concerned with the husking pegs mounted in the husking roll sections, as shown in Fig. 5;

Fig. 8 is an enlarged view of the forward portion of the rubber covered roll section shown in Fig. 2;

Fig. 9 is a sectional view, in the plane of the line IX—IX of Fig. 2, modified to include a spacer between the bearing housings; and Fig. 10 is an enlarged sectional view of the spacer shown in Fig. 9.

In the embodiment of the invention illustrated in the drawing, a corn harvester of the two-row type, adapted for mounting on a farm tractor, includes a harvester frame comprising a pair of inner frame bars 23, preferably of tubular form, as indicated in Fig. 1, adapted to extend longitudinally of the harvester and of a tractor on which the harvester may be mounted, with these bars one at each side of the center line of the tractor and harvester and spaced apart sufficiently that one of the bars will lie at each side of the tractor frame when the harvester is mounted thereon. These bars 23 are connected in spaced relation through suitable cross connecting bars, one of these latter bars being indicated at 26, such bar serving to connect the longitudinal frame bars 23 toward their forward end and the forward end of the harvester rolls. Longitudinally extending frame bars 27, preferably of tubular form, and constituting portions of the harvester frame, are disposed laterally outside of the bars 23 and with their main portion in substantially the same horizontal plane as the bars 23, and they extend forwardly to a point adjacent the cross bar 26.

The bars 27 are secured in desired assembled relation with respect to the bars 23 by suitable cross connections, directly or through connecting brackets, one of such cross connections including brackets 32 between the bar 27 and the adjacent longitudinal frame bar 23, this bracket being rigidly connected to the bar 23, directly or through indirect fillet connection, and to bearing supports 34 detachably connected to the brackets 32 and to the forward end portion, or an extension thereof, of the adjacent bar 27.

A harvester ear snapping and husking unit is mounted on each side of the frame structure just described and comprises, as shown more particularly in Fig. 2, a pair of oppositely rotatable cooperative rolls, the outer roll being indicated generally at 156 and the inner roll at 157. Each pair of rolls is rotatably supported in operative position through a pair of shafts having opposed journal portions at their rear ends disposed in bearings 158 whose housings are supported in relatively fixed position in a bearing supporting plate 38 carried by a rear portion of the frame structure (not shown), and having opposed journal portions at an intermediate point disposed in bearings 159 mounted in the forward bearing support 34. The axis of the outer roll is substantially higher than the axis of the inner roll, as indicated in Figs. 1 and 9.

The outer roll 156 is built up of sections rigidly secured, as by pins 160, on a shaft 161. The forward or snapping element of the roll includes a relatively pointed forward end section 162 extending forwardly beyond the shaft 161 and being of decreasing and disappearing taper toward the rear end thereof. This forward portion of the snapping section is provided with suitably arranged external ribs 163. A rear portion 164 of the snapping section is secured on the shaft immediately adjacent the forward portion 162, the exterior of this portion 164 being provided with external longitudinal ribs 165, preferably four in number, extending to a point adjacent the rear end. The angular position of the portions 162 and 164 on the shaft is such that the rear ends of ribs 163 of section 162 are in longitudinal alinement with the longitudinal ribs 165 of section 164. The ribs on each section 164 merge at their rear ends with a plain cylindrical outer surface 166 having an external diameter at least equal to the external diameter of the ribbed portion merging therewith. The external diameter of these cylindrical portions is also at least equal to the external diameter of the opposed bearing housings mounted in forward bearing support 34.

Rearwardly of and spaced from the roll portion 164 is a trash roll section 167 secured to the shaft and provided with longitudinal ribs 168, preferably of considerably greater number than the ribs 165 of section 164, and extending from the forward end of this section to a point adjacent the rear end thereof where the latter is of reduced diameter to provide a shouldered extension 169.

The husking roll section 172 of the roll 156 is in the form of a cylindrical tube of rubber or the like providing a resiliently yielding and generally smooth husking surface and secured on a cylindrical metal tube 173, the assembled tube and rubber roll section being secured in position with respect to the shaft 161 by pins 174 driven through apertures in the roll section and in the shouldered extensions 169 of the roll section 167 and in the same manner in oppositely shouldered extensions 175 at the forward end of a trash roll section 176. The inner ends of pins 174 are cupped or recessed (note Fig. 8) and when driven into position, the cupped inner end engages the shaft and expands in the space between the shaft and an undercut wall of the sections 167, 176, respectively, to lock the pin against withdrawal while these roll sections are on the shaft. The roll section 176 is also secured to shaft 161 by a pin 160 and is provided with longitudinal ribs 178, generally similar in character and number to the ribs 168 on the roll section 167. The rear end of the roll section 176 is undercut and receives the forward end of the housing for the shaft bearing 158 carried by supporting plate 38. A spur gear 179 is rigidly secured in position on the rear end of the shaft 161 in such a manner with respect to the bearing support that the roll shaft is held in definite position against appreciable longitudinal movement relative to the bearing support. The gear 179 is in driven relation with the spur gear 180 on the shaft 181 of the harvester roll 157.

Each pair of rolls is driven through a suitable connection between the rear end of shaft 181 and a power source (not shown), this shaft being rotated in a counterclockwise direction, viewed from the rear thereof; and, through the gear connection 180, 179, the other harvester roll is driven in an opposite direction.

The harvester roll 157 is of sectional construction and is mounted on its shaft 181, with the forward snapping or picking section 162, 164 of the same design and construction as the corresponding section 162, 164 of the roll 156. The trash roll section 182 is also similar to the corresponding section 167 of the roll 156, except for omission of the reduced extension 169 on the section 167. The husking roll section 183 of the roll 157 is in the form of a cylindrical relatively smooth metal tube telescoped on the rear end of the forward trash section 182 and on the forward end of a rear trash section 184. Tube 183 is secured to trash sections 182 and 184 in any desired manner and the latter is generally similar to the trash section 176 of roll 156, except as to the omission of the reduced forward end extension 175 on the roll section 176. The undercut rear end of the roll section 184 receives the forward end of the housing for the roll bearing 158, this housing also being carried by supporting plate 38. The roll section 183 is provided with a plurality of spaced apertures 186 for receiving yielding husking elements 187.

Each of these husking elements 187 comprises a resilient body portion insertable through the apertures 186 to position within the roll and of a length such that, with the element in normal position, a husking point or peg 191 at one end thereof projects through one aperture 186, and the other end of the element, which has a through aperture 192 therein, projects past the adjacent trailing edge of an oppositely disposed aperture 186 as best shown in Fig. 7. Each element 187 is held in normal position, with the husking point 191 projecting through an aperture 186, by a bracing leaf spring 193 having a curved central portion which generally conforms with and bears against the shaft, and one end portion which bears against and presses the body portion of the element 187 against the inner surface of the roll. The other end of spring 193 is provided with a shouldered portion 194 of reduced width yieldingly extending through the aperture 192 in the adjacent end of husking element 187 and the adjacent aperture 186 in the roll, thus serving, through engagement of this reduced end portion of the bracing spring against the adjacent edge of the aperture 186, to hold the husking element in operative position on the roll. The husking point 191 is formed on the element 187 by distorting the end of the spring element to form a hook-shaped point. The resiliently yielding body portion of the husking element 187 projects the husking points 191 to a position where they bite into the husks of the ears passing over the rolls and tear the husks and draw them downwardly into the space between the oppositely rotating rolls, the latter seizing the husks and drawing them through the rolls, the ears remaining on the upper side of the rolls. As the husking points 191 come into engagement with the husking roll section 172, they are yieldingly forced back into the apertures 186 as shown in Fig. 5.

The forward bearing support 34 carries the roll shaft bearings 159 on which rotate journal sleeves 195 suitably held in fixed position on the shafts 161 and 181, as by a spacing and retaining collar and key (not shown). Support 34 is provided with machined guiding surfaces on which the housings 196 for the roll bearings 159 are supported and maintained in position between the adjacent snapping roll and trash roll sections. The element 34 is also provided with a shoulder at its forward side against which corresponding shoulders on the bearing housings 196 may engage. The outer end of the support 34 is provided with a tubular projection 198 which houses a spring 201. This spring bears at its inner end against the outer bearing housing and at its outer end against an abutment carried at the inner end of an adjusting screw 202 threaded through a plate 203 fitted into a recess 204 in the wall of the tubular housing 198 and removable therefrom by lifting the plate with the adjusting screw therein outwardly from such recess. With the parts in position, the spring 201 urges the outer bearing into and yieldingly holds it at its innermost position (determined by the external diameter of cylindrical surfaces 166), with a predetermined pressure dependent upon the adjustment of the screw, so that the relative positions of the two harvesting rolls are such that the husking roll sections 172, 183 are in substantial contact, as indicated in Fig. 5 and there is a slight clearance between the outer peripheries of the trash roll sections 167, 182 and 176, 184, as indicated in Figs. 4 and 6, and between the rear portions of the snapping roll sections 164, as indicated in Fig. 3. However, in the event any relatively unyielding obstruction, such as an extra heavy stalk or small stone should come between the rolls, the spring 201 will yield sufficiently to permit separation between the forward portions of the rolls to the required extent to permit the obstruction to pass through the rolls.

As previously indicated, the engagement of cylindrical surface portions 166 of snapping sections 164 determines the minimum spacing of the rolls. And when these surface portions are in engagement, it will be seen (note Fig. 2) that the bearing housings 196 are spaced apart thereby avoiding subjecting these relatively movable housings to frequent impact engagement normally resulting from a spreading of material therebetween and from the passage of material therethrough and from the action of spring 201 tending to snap the rolls together when cleared of such material. Moreover, since the external diameter of cylindrical portions 166 is such that there is a slight clearance between the stalk gripping surfaces afforded by the opposed ribs or flutes 165, this construction also prevents the damage to such surfaces or the edges thereof which inherently results from frequent impact engagement of the flutes or ribs, and although impact engagement of the stalk gripping flutes or ribs may be avoided by the use of spacers 197 disposed between bearing housings 196 (note Figs. 9 and 10), a spacer, even if constructed to include a slightly compressible plate 205 of fiber or other suitable material disposed between shims 209 as shown in Fig. 10, still subjects the bearing parts to considerable impact or hammering action. As a result, these bearing parts wear rapidly which in turn necessitates frequent replacement thereof and also frequent adjustment of the spacing of the rolls (this adjustment may be accomplished by adding shims) in order to compensate for the wear of bearing parts and for the permanent deformation of the spacing elements.

The several sections of the rolls are assembled on their shafts in such a manner that the ribs 165 on one of the roll sections 164 will be substantially in line with corresponding ribs on the other of such roll sections as they pass a point between the rolls, as indicated in Fig. 3, and the longitudinal ribs on one of the trash roll sections 167, 182 and the trash roll sections 176, 184 will be out of alinement with the corresponding ribs on the other of such trash roll sections as they rotate past a point at the opposed side of the rolls, as indicated in Figs. 4 and 6, respectively.

One or both of the snapping roll sections 164 are provided adjacent the rear end thereof with one or more detachable snapping clips 206 extending radially outward slightly beyond the periphery of the ribs 165. The clips 206 are attached in longitudinally adjustable position on the rolls through screw bolts 207 passing through elongated apertures in a base portion 208 of the clip. The active portion of the clip is positioned slightly rearwardly of the lagging edge of the rib 165 on the roll at a point where the clip will just clear or pass by the adjacent rib on the opposite roll without interference during rotation of the rolls, these clips during such operation serving to shear or cut any ear stems that are not snapped off.

A gathering chain 241 has its active flight positioned above the picking and husking sections of the two cooperative rolls 156, 157, and in its rearward travel assists in imparting a relatively rearward movement to the corn stalks as the harvester travels forwardly; and after removal of the ears from the stalks, the chain conveys the ears rearwardly over trash sections 167, 168 and over husking sections 172, 183. The course of this chain is in part determined by guides 243, 244 suitably mounted in position between a lower plate 245 and an upper plate, by means of bolts 250.

In operation, as the harvester moves forwardly through a field of standing corn the stalks come under the influence of the gathering chain 241 and pass between the picker sections of the cooperative harvester rolls. As the stalks move rearward relative to the snapping sections of the rolls, the bearing of the outer roll 156 yields sufficiently to accommodate the stalks between the rolls as the rear portion of the snapping section removes the ears from the stalks.

Rearward movement of the upper part of the stalks relative to the rolls is limited by the stalks engaging with support 34 and the bearing housings 196 therein. Loose stalk leaves or other trash carried beyond the snapping roll sections is seized by and carried through the trash roll sections 167. The picked ears are conveyed by the flights of the chain 241 over and along the rolls in contact with the husking sections thereof. Loose husks remaining from the husking operation are seized by and passed through the rear trash roll sections 184, the conveying chain carrying the husked ears rearwardly beyond the husking sections to a point of collection (not shown).

Any loose leaves broken from the stalks or husks removed from the ears during the snapping operation pass rearwardly onto the trash removing sections 167, 168 of the rolls, the latter serving to seize and force this loose material downwardly through these rolls, to the end that the ears of corn passing rearwardly to the husking roll sections are substantially free from loose material or trash. The ears passing over the husking roll sections are subjected to the action of the husking points 191 which bite into the outer husks and serve to loosen or tear portions of the husks so that they are more readily seized between the rubber surfaced roll 172 and the oppositely rotating metal faced roll 183. And since these husked portions are gripped and held solidly, the husks are entirely torn from the ear, the latter remaining at the upper surface of the rolls, and the husks being dragged through to the under side of the rolls. Any loose husks or other material accompanying the husked ears is seized by and drawn downwardly between trash roll sections 176 and 178, the clean husked ears being discharged rearwardly of the harvester rolls.

It should be understood that this invention is not limited to the particular details of construction and design shown and described herein and that the invention includes such other applications and modifications as are fairly included within the scope of the annexed claims.

It is claimed and desired to secure by Letters Patent:

1. In a corn harvester, a supporting frame carrying a pair of cooperative harvesting rolls having side-opposed husking sections, one of said husking sections having an outer surface portion of resiliently yieldable material, and the other of said husking sections comprising a tube supported on a shaft and spaced therefrom, said tube having spaced apertures therethrough, husking elements yieldingly and detachably mounted within said tube and having husking points normally projecting through said apertures for swinging movement about a point spaced circumferentially from the latter, said husking point being yieldingly movable into said other section through the action thereon of said one roll section, each of said husking elements being in the form of a resilient leaf spring having its body portion detachably supported in position within said roll section with the husking point projecting through said aperture, and a securing element for said husking element in the form of a leaf spring removably supported in position within said tube by said roll shaft and engaging with said husking element to clamp the husking element against the inner surface of said tube.

2. A corn harvester ear snapping and husking apparatus comprising a supporting frame, and a pair of forwardly extending rolls rotatably mounted on said frame in cooperative side opposed relation, said rolls presenting forward picker sections including a pair of forwardly extending tapered points joined to rearwardly extending longitudinally ribbed portions wherein the ribs of one roll are in substantial alignment with the corresponding ribs on the other roll as the ribs pass a point between the rolls, trash sections to the rear of and aligned with the picker section and including a pair of longitudinally ribbed portions wherein the ribs of one roll are out of alignment with the ribs of the other roll as the ribs pass a point at the opposed sides of the rolls, and presenting husking sections to the rear of and in alignment with said trash sections and including a pair of smooth surfaced portions with the opposed sides thereof in contact.

3. A corn harvester ear snapping and husking apparatus comprising a supporting frame, and a pair of forwardly extending rolls rotatably mounted on said frame in cooperative side opposed relation, said rolls presenting forward picker sections including a pair of forwardly extending tapered points joined to rearwardly extending longitudinally ribbed portions wherein the ribs of one roll are in substantial alignment with the corresponding ribs on the other roll as the ribs pass a point between the rolls, trash sections including a pair of longitudinally ribbed portions to the rear of and aligned with the picker section and wherein the ribs of one roll are out of alignment with the ribs of the other roll as the ribs pass a point at the opposed sides of the rolls, husking sections to the rear of and in alignment with said trash section and including a pair of smooth surfaced portions with the opposed sides thereof in contact, and presenting additional trash sections similar in construction to said first mentioned trash sections and positioned to the rear of and in alignment with said husking sections.

4. In a corn harvester, a supporting frame, a pair of forwardly extending cooperative rotatable harvester rolls, said rolls presenting in cooperative side opposed relation forward picker sections including a pair of forwardly tapered points joined to rearwardly extending longitudinally ribbed portions wherein the ribs of one roll are in substantial alignment with the ribs on the other roll as the ribs pass a point between the rolls, trash sections to the rear of and aligned with said picker sections and including a pair of longitudinally ribbed portions wherein the ribs of one roll are out of alignment with the ribs of the other roll as the ribs pass a point between the rolls, and presenting husking sections to the rear of and in alignment with said trash section and including a pair of smooth surfaced portions with the opposed sides thereof contacting each other, rear bearings carried by said frame and rotatably supporting portions of said rolls disposed to the rear of said husking sections, and forward bearings carried by said frame and rotatably supporting portions of said rolls disposed between said picking and said trash sections.

5. In a corn harvester, a supporting frame, a pair of forwardly extending cooperative rotatable harvester rolls, said rolls presenting in cooperative side opposed relation forward picker sections including a pair of forwardly tapered points joined to rearwardly extending longitudinally ribbed portions wherein the ribs of one roll are in substantial alignment with the ribs on the other roll as the ribs pass a point between the rolls, trash sections to the rear of and aligned with said picker sections and including a pair of longitudinally ribbed portions wherein the ribs of one roll are out of alignment with the ribs of the other roll as the ribs pass a point between the rolls, husking sections to the rear of and in alignment with said trash sections and including a pair of smooth surfaced portions with the opposed sides thereof contacting each other, and presenting additional trash sections similar in construction to said first mentioned trash sections and disposed to the rear of and aligned with said husking sections, rear bearings carried by said frame and rotatably supporting portions of said rolls disposed to the rear of said trash sections and forward bearings carried by said frame and rotatably supporting portions of said rolls disposed between said picking and said first mentioned trash sections.

6. In a corn harvester, a supporting frame, a pair of forwardly extending cooperative rotatable harvester rolls, said rolls presenting in cooperative side opposed relation forward picker sections including a pair of forwardly tapered points joined to rearwardly extending longitudinally ribbed portions wherein the ribs of one roll are in substantial alignment with the ribs on the other roll as the ribs pass a point between the rolls, trash sections to the rear of and aligned with said picker sections and including a pair of longitudinally ribbed portions wherein the ribs of one roll are out of alignment with the ribs of the other roll as the ribs pass a point between the rolls, husking sections to the rear of and in alignment with said trash sections and including a pair of smooth surfaced portions with the opposed sides thereof contacting each other, and presenting additional trash sections similar in construction to said first mentioned trash sections and disposed to the rear of and aligned with said husking sections, rear bearings carried by said frame and rotatably supporting portions of said rolls disposed to the rear of said trash sections and forward bearings yieldably carried by said frame for relative lateral movement and rotatably supporting portions of said rolls disposed between said picking and said first mentioned trash sections, and said rolls including portions adjacent said forward bearings presenting opposed cylindrical outer surfaces each having a diameter equal to the maximum external diameter of the remaining portions of said rolls and to the maximum external diameter of said forward bearing.

7. In a corn harvester, a supporting frame, a pair of forwardly extending cooperative rotatable harvester rolls, said rolls presenting in cooperative side opposed relation forward picker sections including a pair of forwardly tapered points joined to rearwardly extending longitudinally ribbed portions wherein the ribs of one roll are in substantial alignment with the ribs on the other roll as the ribs pass a point between the rolls, trash sections to the rear of and aligned with said picker sections and including a pair of longitudinally ribbed portions wherein the ribs of one roll are out of alignment with the ribs of the other roll as the ribs pass a point between the rolls, and presenting husking sections to the rear of and in alignment with said trash sections and including a pair of smooth surfaced portions with the opposed sides thereof contacting each other with one of said portions having an outer surface of resiliently yieldable material and the other portion being in the form of a smooth metal tube, fixedly mounted rear bearings carried by said frame and rotatably supporting portions of said rolls disposed to the rear of said husking sections, a hollow bearing support carried by said frame and surrounding a portion of said rolls between said snapping sections and said trash sections, bearings carried by said support and mounting said rolls for relative lateral movement, and means carried by said support yieldingly urging the outer one of said rolls toward the inner one, and said rolls also presenting portions adjacent said hollow support including opposed cylindrical outer surfaces each having a diameter at least equal to the maximum external diameter of the remaining portions of said rolls and to the maximum external diameter of said relatively movable bearing parts, whereby said cylindrical portions determine the minimum spacing of said rolls.

8. A corn harvester ear snapping and husking apparatus comprising a supporting frame, and a pair of forwardly extending rolls rotatably mounted on said frame in cooperative side opposed relation with the forward portions of said rolls supported by means yieldably acting to effect a side abutting engagement of said rolls, said rolls presenting forward picker sections including longitudinally ribbed portions wherein the ribs of one roll are in substantial alignment with the corresponding ribs on the other roll as the ribs pass a point between the rolls, trash sections to the rear of and aligned with the picker sections and including a pair of longitudinally ribbed portions wherein the ribs of one roll are out of alignment with the ribs of the other rolls as the ribs pass a point at the opposed sides of the rolls, husking sections to the rear of and in alignment with said trash sections, and presenting opposed cylindrical portions disposed intermediate said picking and trash sections and each having an external diameter at least equal to the maximum external diameter of the remaining portions of said rolls.

9. In a corn harvester, a supporting frame carrying a pair of cooperative harvesting rolls having side-opposed husking sections, one of said husking sections comprising a tube supported on a shaft in spaced relation thereto and having an aperture therein, a husking element presenting a body portion detachably mounted within said one section and presenting a husking point normally projecting through said aperture, and a resilient element, for clamping the body portion of said husking element against an inner portion of said one section and affording swinging movement of said husking point about a longitudinally extending axis passing through a point positioned in circumferentially spaced proximate relation to said aperture, said resilient element being removably supported within said tube by said roll shaft, said husking point being swingably movable inwardly about said axis through said aperture by the action thereon of said other roll section.

10. In a corn harvester, a supporting frame carrying a pair of cooperative harvesting rolls having side-opposed husking sections, one of said husking sections comprising a tube supported on a shaft in spaced relation thereto and having an aperture therein, a husking element yieldingly and detachably mounted within said tube and having a husk engaging portion normally projecting through said aperture and yieldingly movable thereinto through the action thereon of the other roll section, said husking element having its body portion detachably supported in position within said roll section with the husk engaging portion thereof projecting through said aperture for swinging movement about a point proximate to and circumferentially spaced from said aperture, and a securing element for said husking element in the form of a leaf spring removably supported in position within said tube by said roll shaft and engaging with said husking element to clamp the husking element against an inner surface of said tube.

RECTOR C. FERGASON.

References Cited in the file of this patent

UNITED STATES PATENTS

| Number | Name | Date |
|---|---|---|
| 561,539 | Curtiss | June 2, 1896 |
| 637,534 | Swarthout | Nov. 21, 1899 |
| 721,798 | Hagen | Mar. 3, 1903 |
| 729,438 | Steel | May 26, 1903 |
| 763,611 | Johnston | June 28, 1904 |
| 839,472 | Goodhue | Dec. 25, 1906 |
| 863,812 | Stone | Aug. 20, 1907 |
| 864,227 | Brass | Aug. 27, 1907 |
| 915,934 | Butler et al. | Mar. 23, 1909 |
| 937,715 | Purdy | Oct. 19, 1909 |
| 927,814 | Rosenthal | July 13, 1909 |
| 1,048,624 | Wolfe | Dec. 31, 1912 |
| 1,361,463 | Hohenstein | Dec. 7, 1920 |
| 1,424,060 | Zeier | July 25, 1922 |
| 1,462,815 | Oppenhein et al. | July 24, 1923 |
| 1,493,626 | Gebhardt et al. | May 13, 1924 |
| 2,180,594 | Kuhlman | Nov. 21, 1939 |
| 2,234,447 | Norman | Mar. 11, 1941 |
| 2,391,846 | Scranton | Dec. 25, 1945 |
| 2,469,687 | Fergason | May 10, 1949 |